United States Patent [19]

Mathews et al.

[11] 4,120,118
[45] Oct. 17, 1978

[54] SEMI-DISASSEMBLABLE TOY VEHICLE

[76] Inventors: Richard Mathews; Lorraine Mathews, both of 12909 S. Escanaba, Chicago, Ill. 60633

[21] Appl. No.: 757,486

[22] Filed: Jan. 6, 1977

[51] Int. Cl.² .......................................... A63H 11/10
[52] U.S. Cl. ........................................ 46/201; 46/16; 35/13
[58] Field of Search ................... 46/17, 202, 201, 221, 46/223, 218, 219, 16, 11, 39; 280/240, 213; 206/221; 220/339; 35/13

[56] References Cited

U.S. PATENT DOCUMENTS

| | | | |
|---|---|---|---|
| 3,321,097 | 5/1967 | Solowey | 206/221 |
| 3,741,377 | 6/1973 | Krellen | 220/339 X |
| 3,811,218 | 5/1974 | Salmon et al. | 46/17 |
| 3,924,352 | 12/1975 | Goldfarb et al. | 46/202 |

*Primary Examiner*—Russell R. Kinsey
*Assistant Examiner*—Mickey Yu

*Attorney, Agent, or Firm*—Olson, Trexler, Wolters, Bushnell & Fosse, Ltd.

[57] ABSTRACT

A semi-disassemblable toy vehicle is disclosed and claimed. In general, the vehicle includes a body having a hinged, openable hood and a hinged, openable trunk lid. When the toy user opens the trunk lid, a trunk compartment recess is disclosed, in which a tool box is carried. Within the tool box are a number of wrenches and a screwdriver. After obtaining the tools to work on the vehicle, the playing child can open the hood. Under the hood is an engine compartment recess, in which are an engine, a radiator and a battery representation. Battery caps and a radiator cap can be moved between open and closed positions by applying the appropriate manual dexterity. The wrenches can be used to tighten and loosen spark plug representations carried by the engine. The screwdriver can be used to loosen and tighten an air filter carried atop the engine. While these parts can be loosened, they cannot be entirely removed, thereby obviating the well known propensity of children to loose toy parts.

8 Claims, 13 Drawing Figures

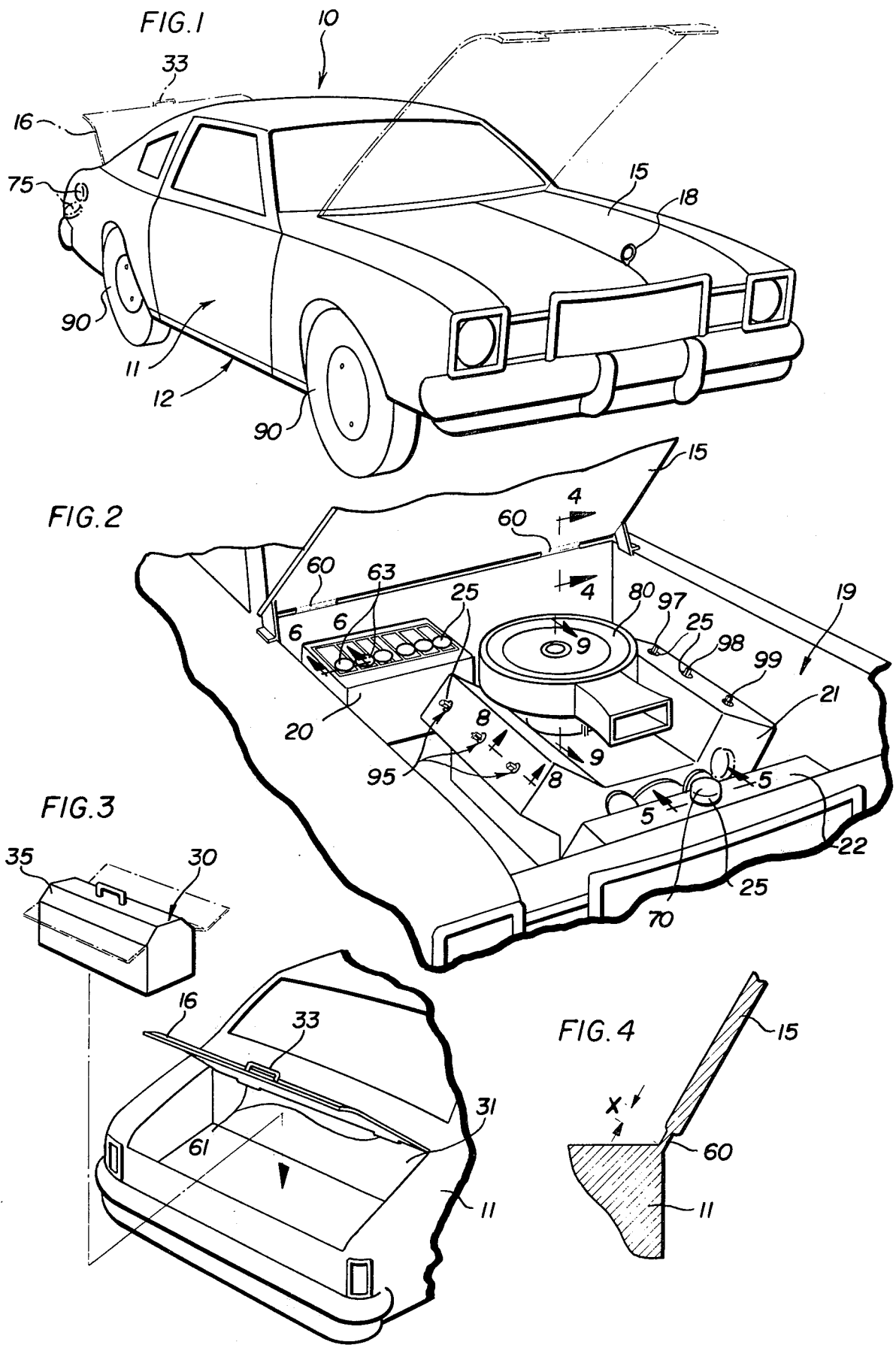

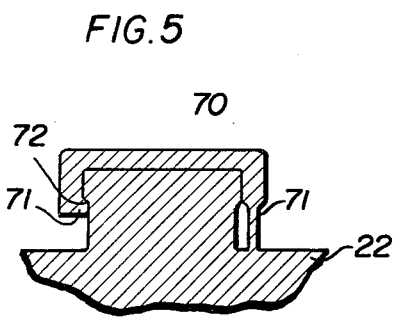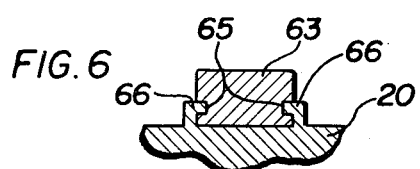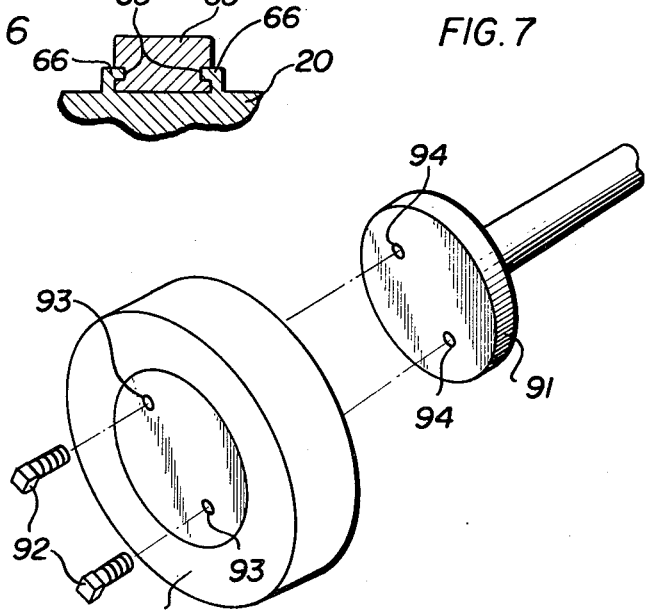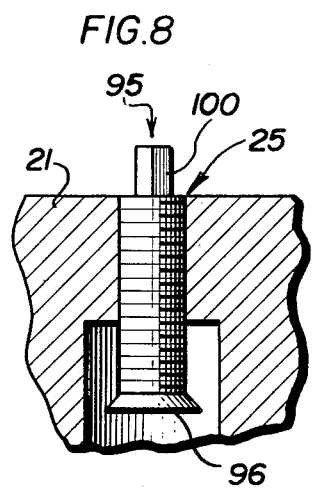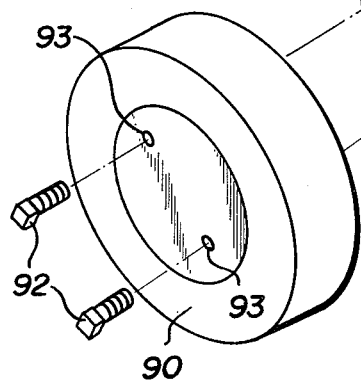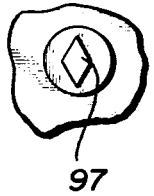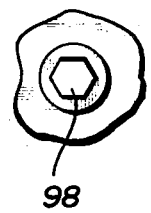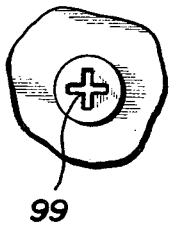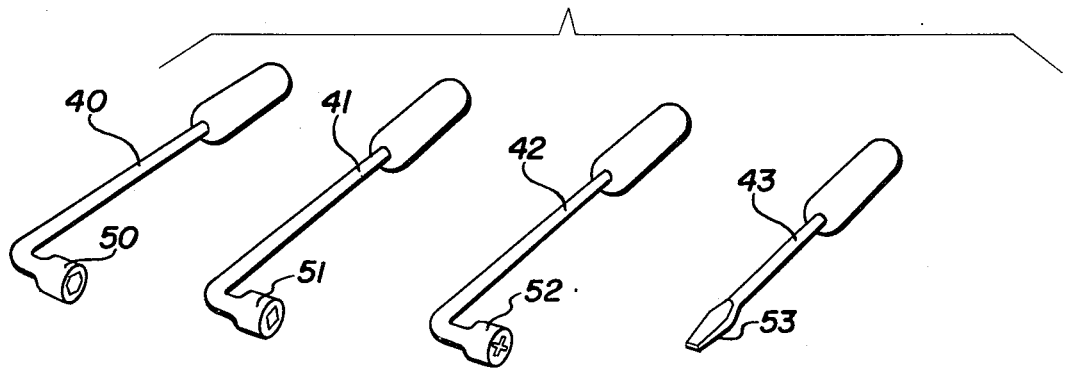

SEMI-DISASSEMBLABLE TOY VEHICLE

BACKGROUND OF THE INVENTION

This invention relates generally to toy vehicles, and more particularly concerns a toy vehicle which provides instructional and educational experience as well as recreational benefit to the playing child.

Toy vehicles such as automobiles are popular with purchasing adults and playing children alike. Many such toys have one or more parts which can be removed from the vehicle to increase the commercial and recreational attractiveness of the toy. Many of these take-apart toys, however, inadvertently encourage the well known propensity of children to loose the removed portions of the toy. Others are not realistic in the operations which the playing child is permitted or encouraged to perform.

It is the general object of the present invention to provide a toy vehicle which will assist in teaching the basics of maipulating standard mechanical elements.

Another object is to provide a vehicle toy which provides a variety of relatively standard mechanical elements and devices for manipulation. To satisfy a related object, the invention requires a corresponding variety of relatively basic manipulations in order to move the mechanical elements between open and closed or assembled and disassembled conditions.

Yet another object is to provide a disassemblable toy vehicle which minimizes or entirely eliminates the loss of vehicle parts.

Yet another object is to provide such a toy which is closely approximates a real vehicle prototype, and which provides a consequent play attractiveness.

Still another object is to offer such a vehicle which provides opportunities to develop manual dexterity and shape association.

A further object is to provide such a vehicle which, during the play use, provides an introduction to automotive parts and the basic mechanical organization of an automobile, and which is correspondingly effective in orienting children in the location of basic vehicle components.

A still further object is to provide such a toy which is rugged and durable even when subjected to the hard use affectionate, active children can give such toys. An associated object is to provide such a vehicle which is safe for play of the type described here.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a perspective view showing the toy in its general aspects;

FIG. 2 is a fragmentary perspective view similar to FIG. 1 but showing the front portion of the toy vehicle including an engine compartment;

FIG. 3 is a fragmentary perspective view similar to FIG. 2 but showing the rear of the vehicle and a trunk compartment;

FIG. 4 is a fragmentary sectional view taken substantially in the plane of line 4—4 in FIG. 2;

FIG. 5 is a fragmentary sectional view taken substantially in the plane of line 5—5 in FIG. 2;

FIG. 6 is a fragmentary sectional view taken substantially in the plane of line 6—6 in FIG. 2;

FIG. 7 is an exploded view showing a vehicle wheel, an associated tire, and associated tire lug bolts;

FIG. 8 is a fragmentary sectional view taken substantially in the plane of line 8—8 of FIG. 2;

FIG. 9 is a fragmentary sectional view taken substantially in the plane of line 9—9 in FIG. 2;

FIG. 10 is a fragmentary inclined view showing the top of a simulated spark plug member shown in FIG. 2;

FIG. 11 is a fragmentary inclined view showing the top of another simulated spark plug member shown in FIG. 2;

FIG. 12 is a fragmentary inclined view showing the top of yet another simulated spark plug member shown in FIG. 2; and FIG. 13 is a perspective view showing typical tools which may be provided for assembly and disassembly operations involving the toy car.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Turning first to FIG. 1, there is shown a toy vehicle 10 embodying the present invention. In general, this vehicle 10 can be considered to comprise a body member 11, which can be formed of molded resinous plastic or similar material, and which is supported upon a chassis member 12 which can similarly be formed of molded resinous plastic or other suitable material. As shown more particularly in FIGS. 2 and 3, the vehicle body is provided with a hinged, openable hood 15 and a hinged, openable trunk lid 16.

When a using child grasps a simulated hood ornament 18 attached to the hood 15 and rotatably opens the hood 15, an engine compartment 19 recessed behind the hood 15 is disclosed. Within this engine compartment 19 are found formations representing a battery 20, an engine 21, and a radiator 22. It will be understood that the other automotive components can be similarily formed and situated within the engine compartment 19. To provide educational as well as recreational interest to the toy in accordance with one aspect of the invention, each of these engine, radiator and battery representations 20-22 carry at least one loosenable member 25, as will be more particularly described below.

It is another feature of the invention that play with this toy provides an introduction to the use of hand tools and the manipulation of basic mechanical elements. To this end, a toy tool box member 30 is shaped and sized to be enclosed within a trunk compartment 31 recessed within the car body 11 below the trunk lid 16. When the trunk handle 33 is grasped and the trunk lid 16 is lifted, the tool box 30 is exposed. When the child removes the tool box 30 and opens a tool box lid 35, a set of wrenches 40, 41 and 42 and a screwdriver 43 are presented for the child's use. Each of these tool members 40-43 is provided with a head 50-52 inclusive or a screwdriver blade 53 adapted to engage at least one of the loosenable members 25 and to alternatively loosen or tighten that member 25 on the associated carrying representation 20-22 inclusive.

It is also a feature of the invention that when the child opens the toy hood 15 or the trunk 16, these openable members rotate into open positions which provide sufficient space for the child to easily remove and replace the tool box 30 from the trunk compartment 31, and to operate the tools 40–43 and the loosenable members 25 inside the engine compartment 19. This is accomplished by providing a first set of flexible membrane hinges 60 between the toy auto body 11 and the hood 15 which are formed unitarily with the hood 15 and body 11, and which further extend over a distance X providing the body-hood clearance necessary to permit the hood 15 to rotate into an open position providing the requisite space. Similarly, a second set of hinges 61 are provided between the toy auto body 11 and the trunk lid 16; they, too, are formed as flexible membranes of reduced thickness, but extend sufficiently to permit the trunk lid 16 to open widely so as to permit the child to remove the tool box 30 without interference.

After getting out the tools and opening the hood, the child is ready to work on the car. In carrying out the invention, it is important to prevent complete removal and the consequent possible loss of the loosenable members 25 from the toy. To this end, each of the loosenable members 25 and the associated engine, battery and radiator 20–22 inside the engine compartment are shaped so as to prevent the loosenable members 25 from being entirely removed. In furtherance of the invention, the loosenable members 25 within the invention compartment 19 do not all require use of the tools 40–43, and not all those members 25 which require use of some tool require use of the same tool. To these ends, the battery representation 20 is provided with battery caps 63 such as shown in FIG. 6. These battery caps are formed with elongate recesses 65 formed to fit within mating tracks 66 formed upon the battery representation 20. By appropriate hand manipulation, the playing child can move the battery caps 63 from closed position such as those illustrated to linerally displaced open positions without the use of any tool. The child thus learns manual dexterity, and becomes familiar with the rudiments of and the desirability of checking the condition of a battery of an automobile. Further, the battery caps 63 cannot be lost.

Similarily, the radiator representation 22 is equipped with a radiator cap 70. Here, a hinge membrane 71 permits the cap to be rotated from the open position shown in phantom lines in FIG. 2 to a closed position such as that shown in solid lines in FIG. 2 and FIG. 5. A cap lip 71 interfits with a radiator undercut 72 to provide a snap fit, thus allowing the cap to be secured in its closed position as shown. This rotational operation, decidedly different from the sliding operation required of the child in working with the battery caps 63, teaches additional manual dexterity. Additionally, this operation suggests to the child that not all capped objects are to be opened in the same manner, and still further suggests the desirability of periodically checking the condition of automotive radiators, and that these radiators may be found at the front of an engine compartment in a real automobile. Another snap-open cap 75, which can be of similar design, is secured to the rear of the auto body 11, and represents a gas cap attachable over and removable from a gasoline filler aperture (not shown).

To provide further educational experience, a simulated air filter 80 is secured atop the engine representation 21. Again, this air filter member 80 can be loosened from its assembled position as shown in FIG. 2. To this end, a loosenable threaded member 82 engages threads formed in the engine representation 21. An expanded skirt 84 secures the threaded member 82 against removal by the playing child. At the upper end, a member slot 85 is formed to accept the blade 53 of the screwdriver 43. When the child rotates the screw member 82, securing pressure on the filter member 80 is relieved and the simulated air filter 80 can be rotated. Again, this structure permits the playing child to learn use of a screwdriver, and to gain further familiarity with elemental mechanical relationships.

As indicated in FIG. 7, a tire representation 90 can be here removed from a vehicle wheel 91. To this end, two lug bolts 92 are threaded through appropriate apertures 93 in the simulated tire 90 into accepting threaded recesses 94 formed in the wheel 91. If desired, these lug bolts 92 and the tire 90 can be entirely removable, since the using child will at once recognize their absence should they become misplaced. Alternatively, appropriate intermediate skirts or other structure (not shown) can be used to loosely retain the lug nuts 92 in the tire 90 and wheel 91 to prevent loss of these parts from the toy.

Yet further educational and instructive value is provided by the representations 25 which take the form of spark plugs 95. As shown in FIGS. 8 and 10–12, these spark plugs 95 are threadably received in the engine representation 21, and are held against complete removal, as by a flared skirt 96.

To teach shape comparisons and elemental selection of wrenches to the child user in another aspect of the invention, these spark plugs 95 have heads of different shapes 97, 98 and 99. As illustrated in FIGS. 10–12, these shapes can take the form of a diamond 97, a hexagon 98, an X or cross 99, or a square 100 such as generally illustrated in FIG. 8. It will be noted that the wrench head 50 has a corresponding female hexagonal shape; the wrench head 51 has a corresponding female diamond shape, and the wrench head 52 has a corresponding female X or cross-shaped head. Thus, each of these wrenches 50–52 fit one of the spark plug heads 97–99, but no wrench fits every spark plug head. Rotation of the spark plug head by the correct wrench operates to loosen or tighten the spark plug member in the engine representation. The child is thus required to select the proper wrench in order to accomplish these tasks. To provide further educational value, these wrenches may be formed of plastic or similar material and can be colored to conform with the colors of the spark plug shapes. Preferrably, however, these colors will not be mated but will, rather, be different or distinguished from the various mating spark plug heads so as to teach that color compatability need not necessarily indicate mechanical or geometric compatability.

When constructed as described and claimed here, the toy vehicle becomes an object of outstanding recreational and educational value, but it can be offered at surprisingly low cost. Since vehicle parts cannot be lost, the vehicle will retain its value for a long time. The vehicle's exceptional realism provides a great attraction to the purchaser and user alike.

The invention is claimed as follows:

1. A semi-disassemblable toy vehicle, comprising in combination, a vehicle body having a hinged openable hood and a hinged openable trunk lid, an engine compartment recess behind the openable hood, a trunk compartment recess behind the openable trunk lid, a plurality of engine, radiator and battery representations affixed within the engine compartment recess, each such representation carrying at least one loosenable member, each representation and the carried loosenable member together defining means for permanently preventing the loosenable member from being entirely removed from the representation, and a plurality of tool members adapted to fit within and be removed from the trunk compartment recess, each tool including a tool head adapted to engage at least one but not all of the loosenable members and operate only the fitted loosenable member so as to alternatively loosen and tighten the fitted loosenable member in the associated carrying representation.

2. A toy vehicle according to claim 1 including a tool box representation removable from and enplaceable in said trunk compartment recess, and adapted to receive and retain all said tool members.

3. A toy vehicle according to claim 1 including first and second hinge means including flexible membranes respectively connecting said hood and trunk lid to said vehicle body and formed unitarily with the hood, trunk lid and body, and extending sufficiently to permit the hood and trunk lid to rotate into respective open positions providing sufficient space for a child to remove tools from the trunk compartment recess and to operate the removal tool and loosenable members inside the engine compartment recess.

4. A toy vehicle according to claim 1 wherein said vehicle body includes a simulated gasoline filler aperture and a gasoline tank cap representation secured to the vehicle body for attachment to and removable from the simulated gasoline filler apparatus.

5. A toy vehicle according to claim 1 wherein said vehicle includes at least one wheel, a tire representation adapted to be affixed to the wheel, and a plurality of tire lug bolts threadable into the wheel for affixing the tire representation to the wheel.

6. A semi-disassemblable toy vehicle comprising, in combination, a vehicle body having a hinged openable hood and a hinged openable trunk lid, an engine compartment recess defined behind the openable hood, a trunk compartment recess defined in behind the openable trunk lid, an engine representation affixed within the engine compartment recess and carrying a plurality of loosenable simulated spark plug members, the engine representation and simulated spark plug members together defining means for permanently preventing the loosenable spark plug members from being entirely removed from the engine presentation, and a plurality of wrench members adapted to fit within and be removed from the trunk compartment recess, each wrench including a tool head adapted to engage at least one of the loosenable simulated spark plug members but not every one of said spark plug members, rotation of the wrench and engaged simulated spark plug operating to alternatively loosen and tighten the simulated spark plug member in the engine representation.

7. A toy vehicle according to claim 6 including a loosenable simulated air filter member, a slotted threaded member for selectively securing the simulated air filter member to the engine representation in a tightened position, and loosely carrying the simulated air cleaner member for rotation about the threaded member upon the engine representation, and a screwdriver member adapted to fit within the slot in the threaded member, rotation of said screwdriver and said threaded member operating to alternatively loosen and tighten the simulated air cleaner member into a location upon the engine representation.

8. A toy car according to claim 6 wherein at least one of said simulated spark plug members includes a wrench-engageable portion formed in a diamond shape, another of said simulated spark plug members includes a wrench-engageable portion formed in an X shape, and yet another simulated spark plug member includes a wrench-engageable portion formed in a hexagonal shape, said wrench members including at least one wrench having a head adapted to engage the simulated spark plug member diamond shape but no other shape, another wrench having a head adapted to engage the simulated spark plug member X-shape but no other shape, and a third wrench having a head adapted to engage the simulated spark plug member hexagonal shape but no other shape, whereby to require the toy user to select the proper wrench in order to accomplish loosening and tightening manipulations of the simulated spark plug member.

* * * * *